United States Patent
Shin et al.

(10) Patent No.: US 7,660,339 B2
(45) Date of Patent: Feb. 9, 2010

(54) APPARATUS AND METHOD FOR ESTIMATING AND CORRECTING FREQUENCY OFFSET IN MB-OFDM UWB SYSTEM USING TIME FREQUENCY HOPPING

(75) Inventors: Cheol-Ho Shin, Daejon (KR); Sung-Woo Choi, Daejon (KR); Sang-In Cho, Daejon (KR); Kyu-Min Kang, Daejon (KR); Sang-Sung Choi, Daejon (KR); Kwang-Roh Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 533 days.

(21) Appl. No.: 11/634,006

(22) Filed: Dec. 5, 2006

(65) Prior Publication Data

US 2007/0133658 A1    Jun. 14, 2007

(30) Foreign Application Priority Data

Dec. 9, 2005  (KR)  ............... 10-2005-0121164
Jul. 25, 2006  (KR)  ............... 10-2006-0069807

(51) Int. Cl.
*H04B 1/18*    (2006.01)
*H04B 1/00*    (2006.01)

(52) U.S. Cl. .................. 375/132; 375/136; 375/147; 375/134; 455/181.2; 455/182.3; 455/188.1; 455/192.1; 455/192.3

(58) Field of Classification Search ........... 375/132, 375/134, 138, 147, 316, 339, 344, 345, 354, 375/362, 326–328, 373–376; 455/75, 77, 455/181.1, 182.1, 182.2, 182.31, 188.1, 189.1, 455/190.1, 191.1, 192.1–192.3, 193.1, 195.1, 455/196.1, 208, 209, 173.1, 176.1, 178.1

See application file for complete search history.

(56) References Cited

U.S. PATENT DOCUMENTS 5,446,423 A  *  8/1995  Bienz et al. ............... 332/170

(Continued)

FOREIGN PATENT DOCUMENTS

| KR | 1998-703715 A | 12/1998 |
|---|---|---|
| KR | 1020020066023 A | 8/2002 |
| KR | 1020030090389 | 11/2003 |

OTHER PUBLICATIONS

"Carrier Frequency Offset Estimation and Correction for Hiperlan/2 WLANs." Andreas Miaoudakis et al. © 2002 IEEE. Proceedings of the Seventh International Symposium on Computers and Communications. pp. 693-698.

(Continued)

*Primary Examiner*—David C Payne
*Assistant Examiner*—Linda Wong
(74) *Attorney, Agent, or Firm*—Ladas & Parry LLP

(57) ABSTRACT

Provided are an apparatus and method for estimating and correcting a frequency offset in a multiband-Orthogonal Frequency Division Multiplexing Ultra-Wideband system using a time frequency hopping. The method includes the steps of: calculating a tangent input having a first value (X) and a second value (Y) by using PS symbols transferred over same frequency band with respect to one of a plurality of frequency bands used for frequency hopping; calculating tan(X/Y) using the first value (X) and the second value (Y), and calculating an index corresponding to the value of tan(X/Y) from a look-up table created by reflecting a relative frequency offset with respect to a center frequency; calculating indexes representing frequency offsets estimated with respect to remaining frequency bands used for frequency hopping from the look-up table by using the calculated index; extracting an index of a numerical controlled oscillator according to correction positions with respect to a plurality of frequency bands by using the calculated indexes; and correcting the frequency offsets estimated using the extracted indexes according to time frequency patterns by using a numerical controlled oscillator table.

2 Claims, 5 Drawing Sheets

U.S. PATENT DOCUMENTS

| | | | | |
|---|---|---|---|---|
| 5,454,010 | A * | 9/1995 | Leveque | 375/136 |
| 5,732,113 | A | 3/1998 | Schmidl et al. | |
| 5,734,972 | A * | 3/1998 | Hayashino et al. | 455/182.2 |
| 5,802,117 | A | 9/1998 | Ghosh | |
| 6,252,464 | B1 * | 6/2001 | Richards et al. | 331/4 |
| 6,275,517 | B1 * | 8/2001 | Izumi | 375/133 |
| 6,381,265 | B1 * | 4/2002 | Hessel et al. | 375/219 |
| 6,584,140 | B1 * | 6/2003 | Lee | 375/132 |
| 6,763,055 | B1 * | 7/2004 | Fry | 375/132 |
| 6,934,388 | B1 * | 8/2005 | Clark | 380/47 |
| 6,983,028 | B2 * | 1/2006 | Ahn | 375/326 |
| 7,050,775 | B2 * | 5/2006 | Mayor et al. | 455/258 |
| 7,061,996 | B2 * | 6/2006 | Kim | 375/321 |
| 7,194,046 | B2 * | 3/2007 | Borowski et al. | 375/327 |
| 7,366,256 | B2 * | 4/2008 | Eudes et al. | 375/324 |
| 7,403,472 | B2 * | 7/2008 | Okada et al. | 370/210 |
| 7,443,783 | B2 * | 10/2008 | DeChamps et al. | 370/208 |
| 2001/0004375 | A1 * | 6/2001 | Partyka | 375/135 |
| 2003/0174757 | A1 * | 9/2003 | Partyka | 375/132 |
| 2003/0174784 | A1 * | 9/2003 | Samarasooriya et al. | 375/308 |
| 2003/0185317 | A1 * | 10/2003 | Borowski et al. | 375/327 |
| 2003/0231728 | A1 * | 12/2003 | Phang et al. | 375/371 |
| 2004/0009759 | A1 * | 1/2004 | Mayor et al. | 455/258 |
| 2004/0096019 | A1 * | 5/2004 | Kim et al. | 375/346 |
| 2005/0007987 | A1 * | 1/2005 | Yagi et al. | 370/347 |
| 2005/0169166 | A1 * | 8/2005 | Okada et al. | 370/208 |
| 2005/0286619 | A1 * | 12/2005 | Haddadin et al. | 375/222 |
| 2006/0083290 | A1 * | 4/2006 | Shin et al. | 375/131 |
| 2006/0146962 | A1 * | 7/2006 | Troya et al. | 375/340 |
| 2007/0105495 | A1 * | 5/2007 | Knight | 455/12.1 |
| 2009/0016466 | A1 * | 1/2009 | Jensen | 375/327 |

OTHER PUBLICATIONS

"A Technique for Orthogonal Frequency Division Multiplexing Frequency Offset Correction." Paul H. Moose. © 1994. IEEE Transactions on Communications. vol. 42, No. 10, pp. 2908-2914.

Youhei Kato, et al; "Frequency Offset Compensation Scheme for MB-OFDM by Frequency Spreading", IEEE $2^{nd}$ International Conference on Volume, vol. 2, pp. 252-257, Oct. 2005.

Chin Wee Yak, et al; "Timing synchronization and frequency offset estimation for Ultra-Wideband (UWB) Multi-Band OFDM Systems", IEEE $16^{th}$ International Symposium on Personal, Indoor and Mobile Radio Communications, vol. 3, pp. 471-475, Sep. 2005.

Tai-Cheng Lee, et al; "High-Precision Frequency Synthesizers for UWB Applications", IEEE Emerging Information Technology Conference, Aug. 2005.

* cited by examiner

FIG. 4 (PRIOR ART)
| PREAMBLE PATTERN | TF CODE | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
FIG. 5 (PRIOR ART)
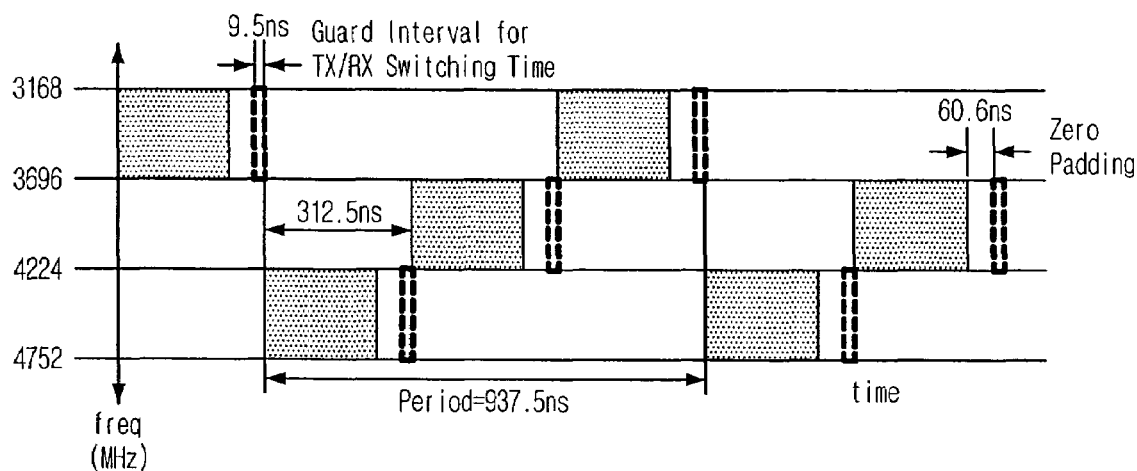
FIG. 6 (PRIOR ART)
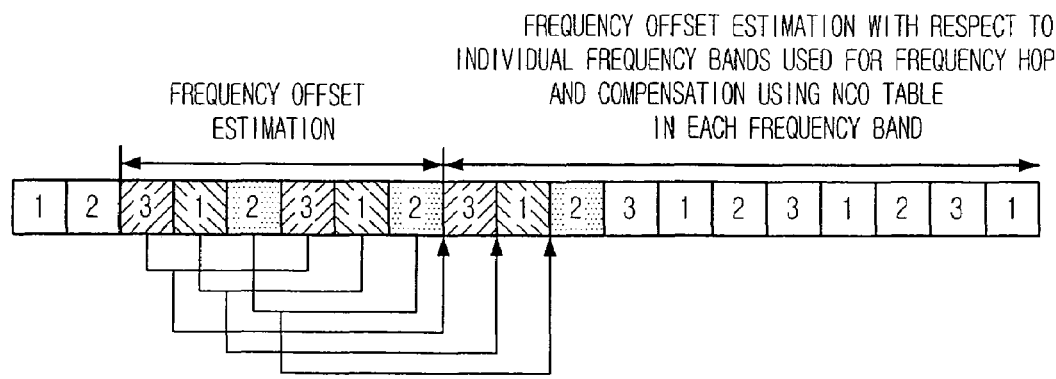

| FREQUENCY BAND | RF1(3432 Mhz) | RF2(3960 Mhz) | RF3(4488 Mhz) |
|---|---|---|---|
| RELATIVE RATIO OF CENTER FREQUENCY | 1 | 1.154 | 1.308 |

FIG. 9A

| F1 | F2 | F3 | F1 | F2 | F3 | F1 | F2 | F3 | F1 | F2 | F3 |
|---|---|---|---|---|---|---|---|---|---|---|---|
| 0 | 0 | 0 | 64 | 74 | 84 | 128 | 148 | 167 | 192 | 222 | 251 |
| 1 | 1 | 1 | 65 | 75 | 85 | 129 | 149 | 169 | 193 | 223 | 252 |
| 2 | 2 | 3 | 66 | 76 | 86 | 130 | 150 | 170 | 194 | 224 | 254 |
| 3 | 3 | 4 | 67 | 77 | 88 | 131 | 151 | 171 | 195 | 225 | 255 |
| 4 | 5 | 5 | 68 | 78 | 89 | 132 | 152 | 173 | 196 | 226 | 256 |
| 5 | 6 | 7 | 69 | 80 | 90 | 133 | 153 | 174 | 197 | 227 | 258 |
| 6 | 7 | 8 | 70 | 81 | 92 | 134 | 155 | 175 | 198 | 228 | 259 |
| 7 | 8 | 9 | 71 | 82 | 93 | 135 | 156 | 177 | 199 | 230 | 260 |
| 8 | 9 | 10 | 72 | 83 | 94 | 136 | 157 | 178 | 200 | 231 | 262 |
| 9 | 10 | 12 | 73 | 84 | 95 | 137 | 158 | 179 | 201 | 232 | 263 |
| 10 | 12 | 13 | 74 | 85 | 97 | 138 | 159 | 181 | 202 | 233 | 264 |
| 11 | 13 | 14 | 75 | 87 | 98 | 139 | 160 | 182 | 203 | 234 | 266 |
| 12 | 14 | 16 | 76 | 88 | 99 | 140 | 162 | 183 | 204 | 235 | 267 |
| 13 | 15 | 17 | 77 | 89 | 101 | 141 | 163 | 184 | 205 | 237 | 268 |
| 14 | 16 | 18 | 78 | 90 | 102 | 142 | 164 | 186 | 206 | 238 | 269 |
| 15 | 17 | 20 | 79 | 91 | 103 | 143 | 165 | 187 | 207 | 239 | 271 |
| 16 | 18 | 21 | 80 | 92 | 105 | 144 | 166 | 188 | 208 | 240 | 272 |
| 17 | 20 | 22 | 81 | 93 | 106 | 145 | 167 | 190 | 209 | 241 | 273 |
| 18 | 21 | 24 | 82 | 95 | 107 | 146 | 168 | 191 | 210 | 242 | 275 |
| 19 | 22 | 25 | 83 | 96 | 109 | 147 | 170 | 192 | 211 | 243 | 276 |
| 20 | 23 | 26 | 84 | 97 | 110 | 148 | 171 | 194 | 212 | 245 | 277 |
| 21 | 24 | 27 | 85 | 98 | 111 | 149 | 172 | 195 | 213 | 246 | 279 |
| 22 | 25 | 29 | 86 | 99 | 112 | 150 | 173 | 196 | 214 | 247 | 280 |
| 23 | 27 | 30 | 87 | 100 | 114 | 151 | 174 | 198 | 215 | 248 | 281 |
| 24 | 28 | 31 | 88 | 102 | 115 | 152 | 175 | 199 | 216 | 249 | 283 |
| 25 | 29 | 33 | 89 | 103 | 116 | 153 | 177 | 200 | 217 | 250 | 284 |
| 26 | 30 | 34 | 90 | 104 | 118 | 154 | 178 | 201 | 218 | 252 | 285 |
| 27 | 31 | 35 | 91 | 105 | 119 | 155 | 179 | 203 | 219 | 253 | 286 |
| 28 | 32 | 37 | 92 | 106 | 120 | 156 | 180 | 204 | 220 | 254 | 288 |
| 29 | 33 | 38 | 93 | 107 | 122 | 157 | 181 | 205 | 221 | 255 | 289 |
| 30 | 35 | 39 | 94 | 108 | 123 | 158 | 182 | 207 | 222 | 256 | 290 |

| | | | | | | | | | | | |
|---|---|---|---|---|---|---|---|---|---|---|---|
| 31 | 36 | 41 | 95 | 110 | 84 | 159 | 183 | 208 | 223 | 257 | 292 |
| 32 | 37 | 42 | 96 | 111 | 85 | 160 | 185 | 209 | 224 | 258 | 293 |
| 33 | 38 | 43 | 97 | 112 | 86 | 161 | 186 | 211 | 225 | 260 | 294 |
| 34 | 39 | 44 | 98 | 113 | 88 | 162 | 187 | 212 | 226 | 261 | 296 |
| 35 | 40 | 46 | 99 | 114 | 89 | 163 | 188 | 213 | 227 | 262 | 297 |
| 36 | 42 | 47 | 100 | 115 | 90 | 164 | 189 | 215 | 228 | 263 | 298 |
| 37 | 43 | 48 | 101 | 117 | 92 | 165 | 190 | 216 | 229 | 264 | 300 |
| 38 | 44 | 50 | 102 | 118 | 93 | 166 | 192 | 217 | 230 | 265 | 301 |
| 39 | 45 | 51 | 103 | 119 | 94 | 167 | 193 | 218 | 231 | 267 | 302 |
| 40 | 46 | 52 | 104 | 120 | 95 | 168 | 194 | 220 | 232 | 268 | 303 |
| 41 | 47 | 54 | 105 | 121 | 97 | 169 | 195 | 221 | 233 | 269 | 305 |
| 42 | 48 | 55 | 106 | 122 | 98 | 170 | 196 | 222 | 234 | 270 | 306 |
| 43 | 50 | 56 | 107 | 123 | 99 | 171 | 197 | 224 | 235 | 271 | 307 |
| 44 | 51 | 58 | 108 | 125 | 101 | 172 | 198 | 225 | 236 | 272 | 309 |
| 45 | 52 | 59 | 109 | 126 | 102 | 173 | 200 | 226 | 237 | 273 | 310 |
| 46 | 53 | 60 | 110 | 127 | 103 | 174 | 201 | 228 | 238 | 275 | 311 |
| 47 | 54 | 61 | 111 | 128 | 105 | 175 | 202 | 229 | 239 | 276 | 313 |
| 48 | 55 | 63 | 112 | 129 | 106 | 176 | 203 | 230 | 240 | 277 | 314 |
| 49 | 57 | 64 | 113 | 130 | 107 | 177 | 204 | 232 | 241 | 278 | 315 |
| 50 | 58 | 65 | 114 | 132 | 109 | 178 | 205 | 233 | 242 | 273 | 317 |
| 51 | 59 | 67 | 115 | 133 | 110 | 179 | 207 | 234 | 243 | 280 | 318 |
| 52 | 60 | 68 | 116 | 134 | 111 | 180 | 208 | 235 | 244 | 282 | 319 |
| 53 | 61 | 69 | 117 | 135 | 112 | 181 | 209 | 237 | 245 | 283 | 320 |
| 54 | 62 | 71 | 118 | 136 | 114 | 182 | 210 | 238 | 246 | 284 | 322 |
| 55 | 63 | 72 | 119 | 137 | 115 | 183 | 211 | 239 | 247 | 285 | 323 |
| 56 | 65 | 73 | 120 | 138 | 116 | 184 | 212 | 241 | 248 | 286 | 324 |
| 57 | 66 | 75 | 121 | 141 | 118 | 185 | 213 | 242 | 249 | 287 | 326 |
| 58 | 67 | 76 | 122 | 140 | 119 | 186 | 215 | 243 | 250 | 289 | 327 |
| 59 | 68 | 77 | 123 | 142 | 120 | 187 | 216 | 245 | 251 | 290 | 328 |
| 60 | 69 | 78 | 124 | 143 | 122 | 188 | 217 | 246 | 252 | 291 | 330 |
| 61 | 70 | 80 | 125 | 144 | 123 | 189 | 218 | 247 | 253 | 292 | 331 |
| 62 | 72 | 81 | 126 | 145 | 123 | 190 | 219 | 249 | 254 | 293 | 332 |
| 63 | 73 | 82 | 127 | 147 | 123 | 191 | 220 | 250 | 255 | 294 | 334 |

FREQUENCY OFFSET ESTIMATION

FREQUENCY OFFSET ESTIMATION WITH RESPECT TO REMAINING FREQUENCY BANDS BY USING LOOK-UP TABLE OF Fig. 9, AND COMPENSATION USING NCO TABLE IN EACH FREQUENCY BAND

APPARATUS AND METHOD FOR ESTIMATING AND CORRECTING FREQUENCY OFFSET IN MB-OFDM UWB SYSTEM USING TIME FREQUENCY HOPPING

FIELD OF THE INVENTION

The present invention relates to an apparatus and method for estimating and correcting a frequency offset in a multi-band-Orthogonal Frequency Division Multiplexing (MB-OFDM) Ultra-Wideband (UWB) system using a time frequency (TF) hopping; and, more particularly, to an apparatus and method for estimating and correcting a frequency offset using TF hopping in an MB-OFDM UWB system, in which a frequency offset of one of three frequency bands used in TF hopping is estimated and a frequency offset of each of the three frequency bands is estimated and corrected using a look-up table.

DESCRIPTION OF RELATED ART

Unlike the existing narrowband system and the wideband system, called a Third Generation (3G) cellular technology, an Ultra-Wideband (UWB) technology represents a system occupying a bandwidth of more than 20% of a center frequency, or a wireless transmission technology occupying a bandwidth of more than 0.5 GHz. An Orthogonal Frequency Division Multiplexing (OFDM) is a modulation scheme that spreads data over a large number of carriers spaced apart from a correct frequency at regular intervals.

FIG. 1 is a diagram illustrating primary and secondary frequency offset estimation and correction using a preamble structure of an IEEE 802.11a wireless local access network (WLAN).

The WLAN performs a primary frequency offset estimation in ten short training sequences by using a preamble structure, corrects the frequency offset using a numerical controlled oscillator (NCO), and performs a secondary frequency offset estimation and correction by using two long training sequences.

A paper entitled "A Technique for Orthogonal Frequency division Multiplexing Frequency Offset Correction", IEEE Transactions On Communications, VOL. 42, NO. 10, October 1994, discloses a frequency offset estimation method, which is given by Eq. 1, as a maximum likelihood estimate (MLE) using repetitive data symbols.

$$\hat{\varepsilon} = (1/2\pi)\tan^{-1}\left\{\left(\sum_{k=-K}^{K} \text{Im}[Y_{2k}Y_{1k}^*]\right) \bigg/ \left(\sum_{k=-K}^{K} \text{Re}[Y_{2k}Y_{1k}^*]\right)\right\} \quad \text{Eq. 1}$$

where $\varepsilon$ represents a ratio of a frequency offset estimated with respect to a carrier interval, and $Y_{2k}Y_{1k}$ represents two consecutive pilot group reception symbols.

A paper entitled "Carrier Frequency Offset Estimation and Correction for Hiperlan/2 WLANs", ISCC '02, discloses a carrier frequency offset estimation and correction method for overcoming performance degradation caused when a carrier frequency offset occurs in a Hiperlan2 system. This paper teaches that when a frequency offset at each time is estimated by tracking phase variation between two consecutive symbols among well-known training symbols, a frequency offset estimation range is limited by carrier intervals. In order to overcome this problem, a coarse frequency offset is primarily estimated and corrected using symbols having carrier intervals wider than those of OFDM carriers to be actually transmitted. Then, a fine frequency offset is secondarily estimated and corrected using the well-known repetitive symbols having the intervals of the OFDM symbol carriers to be actually transmitted. Consequently, the frequency offset estimation range is expanded.

Korean Laid-Open Patent Publication No. 2003-0090389 discloses a frequency offset estimation and correction method using preamble information in an IEEE 802.11a WLAN of FIG. 1 by using the frequency offset estimation disclosed in the above-described papers and also discloses a structure of an NCO.

FIG. 2 is a diagram illustrating a preamble structure of an MB-OFDM UWB system that is under standardization in IEEE 802.15.3a.

Referring to FIG. 2, a very large number of RX algorithms, including a carrier frequency estimation, must be carried out during a preamble period. Specifically, a carrier frequency estimation and correction must be carried out within first twenty-one PS symbols during the preamble period. Since OFDM symbols are transmitted while hoping three frequency bands, the frequency offset estimation and correction for the each of three frequency bands is required. However, the hardware complexity and power consumption need to be reduced in order for wide application in the future.

As illustrated in FIG. 3, the MB-OFDM UWB system has fourteen channels allocated at intervals of 528 MHz within 3.1-10.6 GHz UWB bands defined by FCC, and consists of five band groups. Each of the four band groups consists of three frequency bands, and one band group consists of two frequency bands. The band group #1 is necessarily used, and the other band groups are allocated for the future use.

The MB-OFDM scheme must change the frequency at each OFDM symbol according to time frequency (TF) hopping patterns, as illustrated in FIG. 4. A transfer protocol of the MB-OFDM UWB system is illustrated in FIG. 5. Referring to FIG. 5, the OFDM symbol is transferred while hopping three frequency bands corresponding to the band group #1 according to the preamble pattern 2 of FIG. 4.

FIG. 6 is a diagram illustrating a method for estimating the frequency offset in each frequency band according to the TF patterns of FIG. 4 using the method of Eq. 1, and correcting the symbols matching each center frequency band.

When the frequency offset is estimated, individual hardware is required for estimating the frequency offset in the three frequency bands. At least six OFDM symbols are required for the frequency offset estimation. Thus, if the frequency offset is estimated and corrected in this manner, hardware becomes complex and power consumption increases.

SUMMARY OF THE INVENTION

It is, therefore, an object of the present invention to provide an apparatus and method for estimating and correcting a frequency offset in an MB-OFDM UWB system, in which a frequency offset of a specific frequency is estimated from OFDM symbols transferred using several frequencies, frequency offsets of TX frequencies are estimated using a look-up table created by reflecting a relative difference of the center frequencies between the TX frequencies, and the frequency offsets are corrected using an NCO. Accordingly, the hardware complexity and power consumption can be reduced.

In accordance with an aspect of the present invention, there is provided a method for estimating and correcting a frequency offset in a multiband-orthogonal Frequency Division Multiplexing Ultra-Wideband system using a time frequency hopping includes the steps of: calculating a tangent input having a first value (X) and a second value (Y) by using PS symbols transferred over same frequency band with respect to one of a plurality of frequency bands used for frequency hopping; calculating tan(X/Y) using the first value (X) and the second value (Y), and calculating an index corresponding to the value of tan(X/Y) from a look-up table created by reflecting a relative frequency offset with respect to a center frequency; calculating indexes representing frequency offsets estimated with respect to remaining frequency bands used for frequency hopping from the look-up table by using the calculated index; extracting an index of a numerical controlled oscillator according to correction positions with respect to a plurality of frequency bands by using the calculated indexes; and correcting the frequency offsets estimated using the extracted indexes according to time frequency patterns by using a numerical controlled oscillator table.

In accordance with another aspect of the present invention, an apparatus for estimating and correcting a frequency offset in a multiband-Orthogonal Frequency Division Multiplexing Ultra-Wideband system using a time frequency hopping includes: a look-up table constructed by reflecting relative frequency offsets of frequencies used for frequency hopping with respect to a center frequency; a tangent input value calculator for calculating a tangent input having a first value (X) and a second value (Y) by using PS symbols transferred over same frequency band with respect to one of a plurality of frequency bands used for frequency hopping; an index calculator for calculating a value of tan(X/Y) by using the first value (X) and the second value (Y) calculated by the tangent input value calculator, calculating an index corresponding to the calculated value of tan(X/Y) from the look-up table, and calculating indexes representing frequency offsets estimated with respect to remaining frequency bands used for frequency hopping from the look-up table by using the calculated index; and a frequency offset corrector for extracting an index of a numerical controlled oscillator according to correction positions with respect to a plurality of frequency bands by using the calculated indexes, and correcting the frequency offsets estimated using the extracted indexes according to time frequency patterns by using a numerical controlled oscillator table.

BRIEF DESCRIPTION OF THE DRAWINGS

The above and other objects and features of the present invention will become apparent from the following description of the preferred embodiments given in conjunction with the accompanying drawings, in which:

FIG. 2 is a diagram illustrating a preamble structure of an MB-OFDM UWB system that is under standardization in IEEE 802.15.3a;

FIG. 4 is a diagram illustrating TF codes of an MB-OFDM system;

FIG. 5 is a diagram of a transfer protocol in an MB-OFDM UWB system;

FIG. 6 is a diagram illustrating a method for estimating and correcting a frequency offset at three frequency bands in an MLE scheme using MB-OFDM preamble symbols;

FIGS. 9A and 9B illustrate a look-up table used in the present invention; and

FIG. 10 is a diagram illustrating a method for estimating and correcting a frequency offset in accordance with an embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
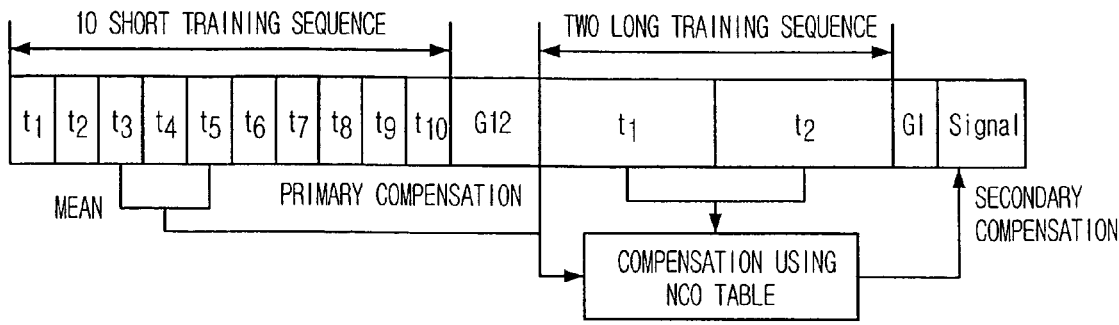
FIG. 1 is a diagram illustrating primary and secondary frequency offset estimation and correction in an IEEE 802.11a WLAN.
Figure 2:
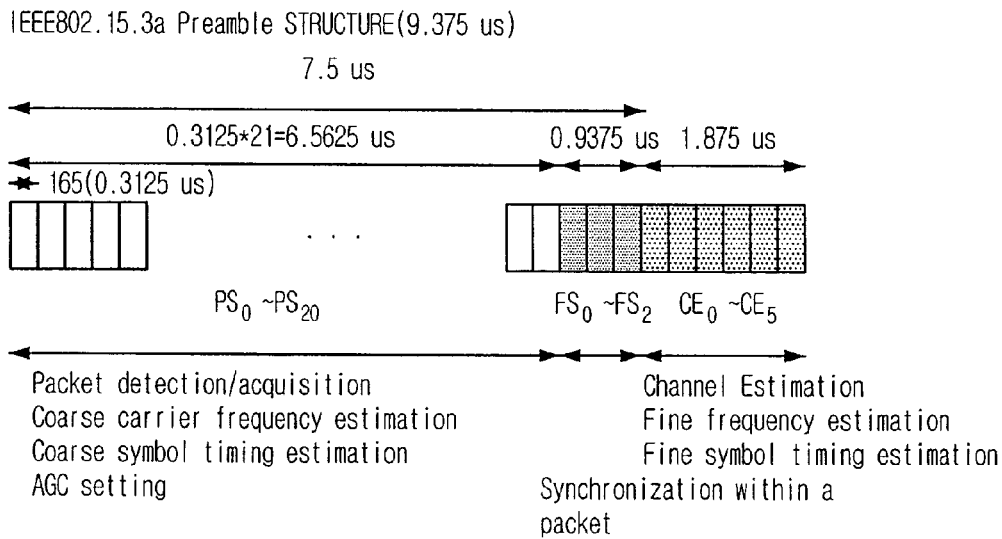
Figure 3:
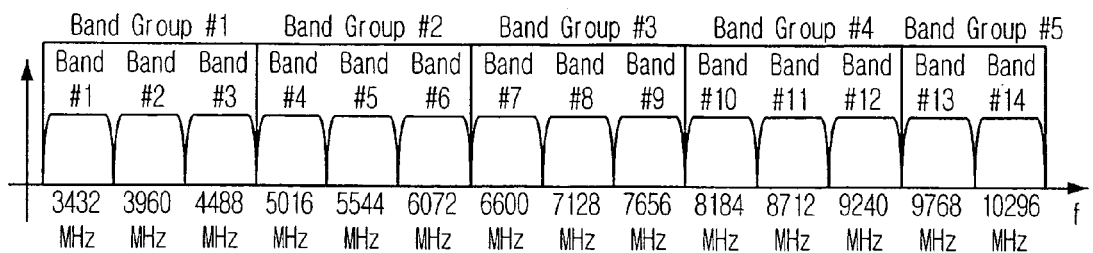
FIG. 3 is an exemplary diagram of a frequency allocation in an MB-OFDM UWB system.
Figures 7, 8:
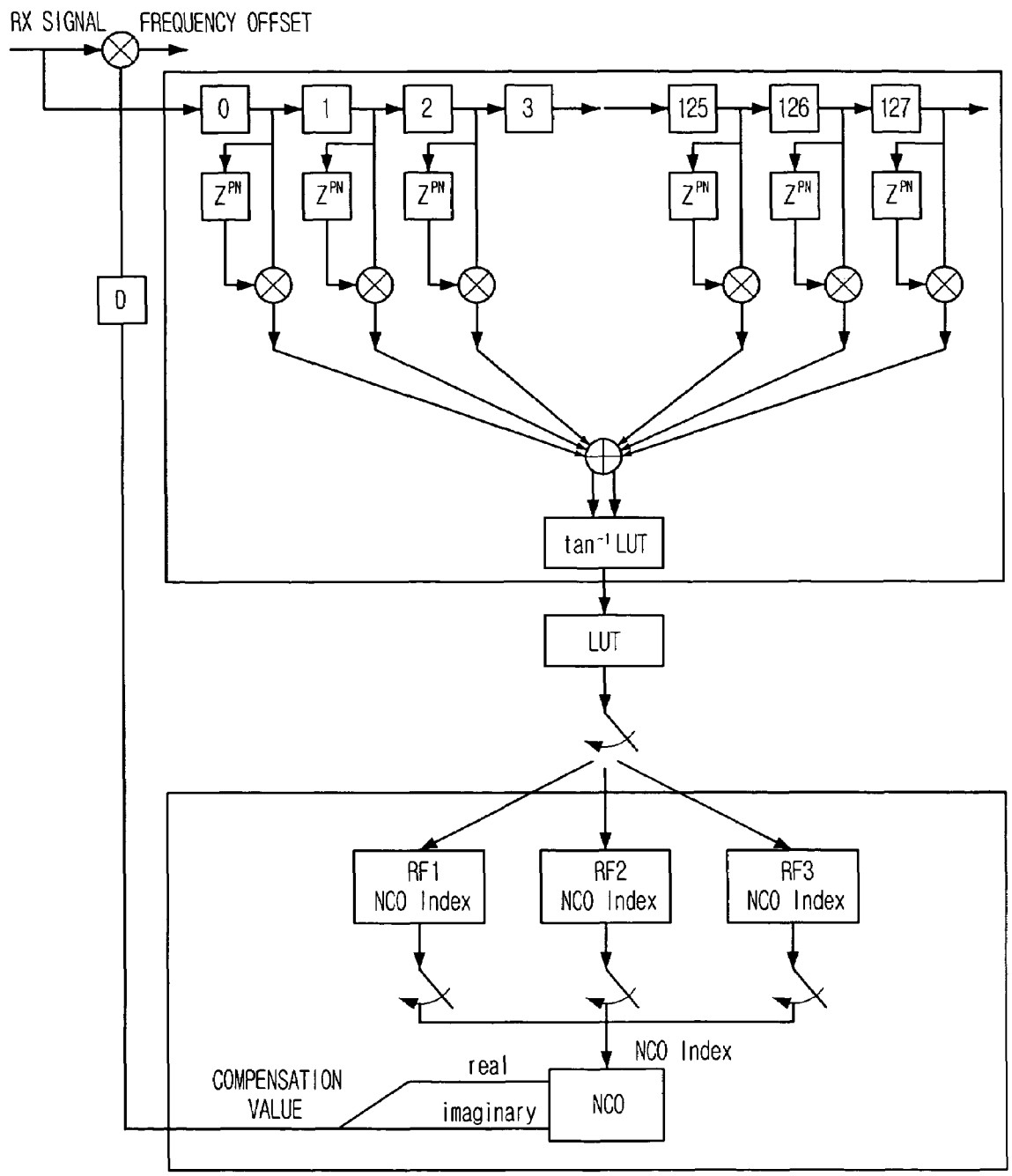
FIG. 7 is a diagram illustrating a method for estimating and correcting a frequency offset in accordance with an embodiment of the present invention.
FIG. 8 is a diagram illustrating relative ratios of a center frequency at three frequency bands in a band group #1.
Figures 9B, 10:
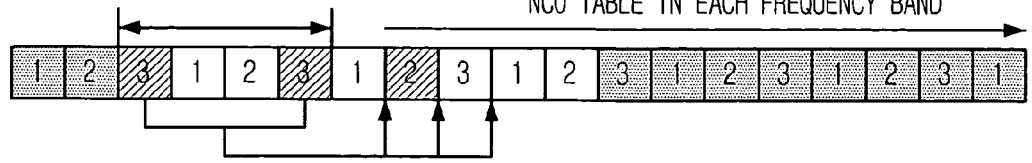

FIG. 7 is a diagram illustrating a method for estimating and correcting a frequency offset in accordance with an embodiment of the present invention, and FIG. 8 is a diagram illustrating relative ratios of a center frequency in three frequency bands in the band group #1. FIGS. 9A and 9B illustrate a look-up table used in the present invention, and FIG. 10 is a diagram illustrating a method for estimating and correcting a frequency offset in accordance with an embodiment of the present invention.

Based on characteristics of the MB-OFMD UWB system employing the TF hopping, the present invention uses a look-up table (LUT) in which the relative frequency offset with respect to the center frequency is reflected.

The MB-OFDM UWB system transfers the OFDM symbols using several center frequencies, for example three center frequencies in the case of the band groups #1 to #4. Though three center frequencies are derived from the same reference oscillator, the actual frequency offset value generated at each center frequency increases proportional to the center frequency.

Using these characteristics, a frequency offset for one of the three frequency bands used in the frequency hopping is calculated. Frequency offsets for the other frequency bands are estimated using the look-up table of FIGS. 9A and 9B created using the relative ratios with respect to center frequencies of the three frequency bands. The NCOs corresponding to the respective center frequencies are driven according to the frequency hopping periods and the frequency offsets are corrected with respect to the three frequency bands.

The method for estimating and correcting the frequency offset in accordance with the present invention will be described in more detail with reference to the accompanying drawings.

In the MB-OFDM UWB system, instead of constructing the same three frequency offset estimation modules in order to estimate the frequency offset with respect to the three frequency bands hopping according to the TF patterns, the look-up table of FIGS. 9A and 9B is constructed using the relative ratios of the center frequencies in the three frequency bands as illustrated in FIG. 8.

The process of estimating and correcting the frequency offset using the look-up table will be described with reference to FIG. 7.

Referring to FIG. 7, a tangent input having a first value (real(X)) and a second value (imaginary (Y)) is calculated using two PS symbols transmitted over the same frequency bands as illustrated in FIG. 10. tan(X/Y) is calculated using the calculated X and Y values. An index corresponding to tan(X/Y) is obtained from the look-up table showing the values of $\tan^{-1}$.

In this manner, the index of $\tan^{-1}$ corresponding to the frequency offset with respect to one of the three frequency bands used in the hopping is obtained, and the indexes representing the frequency offsets with respect to the remaining two frequency bands are read from the look-up table of FIGS. 9A and 9B. Then, the NCO is driven according to the hopping pattern to correct the frequency offsets. For example, when the index in the look-up table expressing $\tan^{-1}$ corresponding to the frequency offset with respect to RF1 is 62, the indexes with respect to RF2 and RF3 are 72 and 81, respectively. Using the obtained indexes, the NCO is driven.

As described above, the MB-OFDM UWB system using the TF hopping, which is under standardization as IEEE 802.15.3a Alt-PHY, estimates the frequency offsets of frequencies from the frequency offset estimation value of one frequency band by using the look-up table showing the relative frequency offsets with respect to the center frequencies of the OFDM symbols transferred using different frequencies according to the preamble, and then corrects the frequency offsets by using the NCO. Accordingly, the hardware complexity and power consumption can be reduced in the actual receiver implementation, and more preamble symbols can be allocated in the other algorithm implementation excluding the frequency offset estimation.

The present application contains subject matter related to Korean patent application No. 2005-121164, filed in the Korean Intellectual Property Office on Dec. 9, 2005, and Korean patent application No. 2006-69807, filed in the Korean Intellectual Property Office on Jul. 7, 2006, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for estimating and correcting a frequency offset in a multiband-Orthogonal Frequency Division Multiplexing Ultra-Wideband system using a time frequency hopping, comprising the steps of:

calculating a tangent input having a first value (X) and a second value (Y) by using PS symbols transferred over same frequency band with respect to one of a plurality of frequency bands used for frequency hopping;

calculating tan(X/Y) using the first value (X) and the second value (Y), and calculating an index corresponding to the value of tan(X/Y) from a look-up table created by reflecting a relative frequency offset with respect to a center frequency;

calculating indexes representing frequency offsets estimated with respect to remaining frequency bands used for frequency hopping from the look-up table by using the calculated index;

extracting an index of a numerical controlled oscillator according to correction positions with respect to a plurality of frequency bands by using the calculated indexes; and correcting the frequency offsets estimated using the extracted indexes according to time frequency patterns by using a numerical controlled oscillator table.

2. An apparatus for estimating and correcting a frequency offset in a multiband-Orthogonal Frequency Division Multiplexing Ultra-Wideband system using a time frequency hopping, comprising:

a look-up table constructed by reflecting relative frequency offsets of frequencies used for frequency hopping with respect to a center frequency;

a tangent input value calculator for calculating a tangent input having a first value (X) and a second value (Y) by using PS symbols transferred over same frequency band with respect to one of a plurality of frequency bands used for frequency hopping;

an index calculator for calculating a value of tan(X/Y) by using the first value (X) and the second value (Y) calculated by the tangent input value calculator, calculating an index corresponding to the calculated value of tan(X/Y) from the look-up table, and calculating indexes representing frequency offsets estimated with respect to remaining frequency bands used for frequency hopping from the look-up table by using the calculated index; and a frequency offset corrector for extracting an index of a numerical controlled oscillator according to correction positions with respect to a plurality of frequency bands by using the calculated indexes, and correcting the frequency offsets estimated using the extracted indexes according to time frequency patterns by using a numerical controlled oscillator table.

* * * * *